United States Patent [19]

Nanba

[11] Patent Number: 4,464,038

[45] Date of Patent: Aug. 7, 1984

[54] DISTANCE MEASURING DEVICE FOR USE IN A CAMERA

[75] Inventor: Yasuhiro Nanba, Osaka, Japan

[73] Assignee: Minolta Camera Kabushiki Kaisha, Osaka, Japan

[21] Appl. No.: 331,817

[22] Filed: Dec. 17, 1981

[30] Foreign Application Priority Data

Dec. 22, 1980 [JP] Japan .................. 55-182658

[51] Int. Cl.³ .................. G03B 3/00; G03B 13/18
[52] U.S. Cl. .................................. 354/403
[58] Field of Search ......................... 354/25, 403

[56] References Cited

U.S. PATENT DOCUMENTS 3,813,679 5/1974 Hasegawa et al. .................. 354/25
4,251,144 2/1981 Matsuda et al. .................... 354/25
4,313,654 2/1982 Matsui et al. ...................... 354/25

Primary Examiner—Russell E. Adams
Attorney, Agent, or Firm—Wenderoth, Lind & Ponack

[57] ABSTRACT

A distance measuring device includes light emitting diode for emitting light toward a subject to be photographed, and a pair of light receiving elements spaced by a predetermined base length from the light receiving diode. The light receiving elements are position side-by-side such that the boundary therebetween extends in a direction which is perpendicular to the direction of the base length so that an image formed by the light emitted to, and reflected from, the subject, will be formed on the light receiving elements in a bridged manner. The respective areas on the light receiving elements occupied by the image differ relative to the distance to the subject. A ratio between the signal levels obtained from the light receiving elements is calculated as a signal representing the distance to the subject.

8 Claims, 10 Drawing Figures

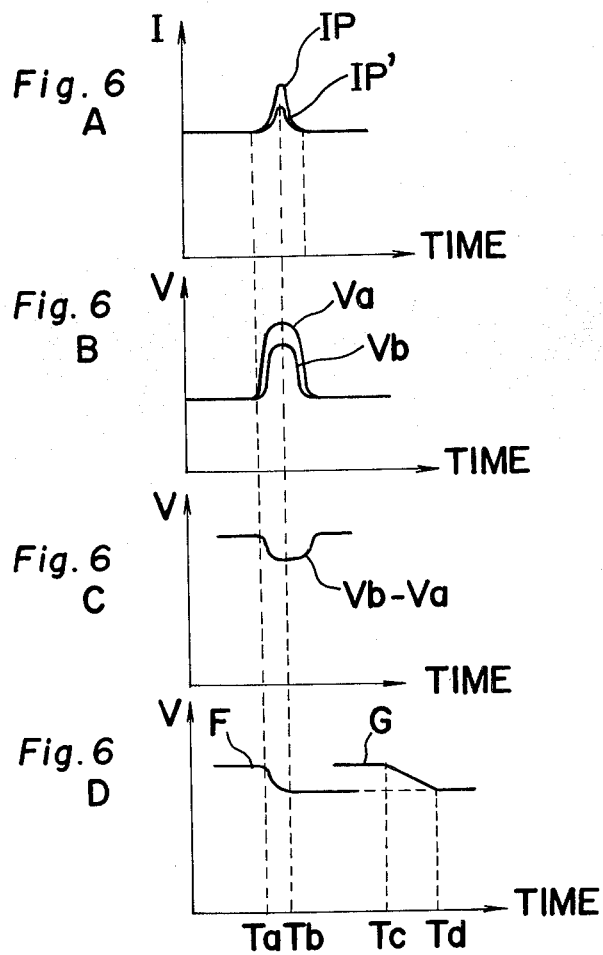
Fig. 6 A
Fig. 6 B
Fig. 6 C
Fig. 6 D
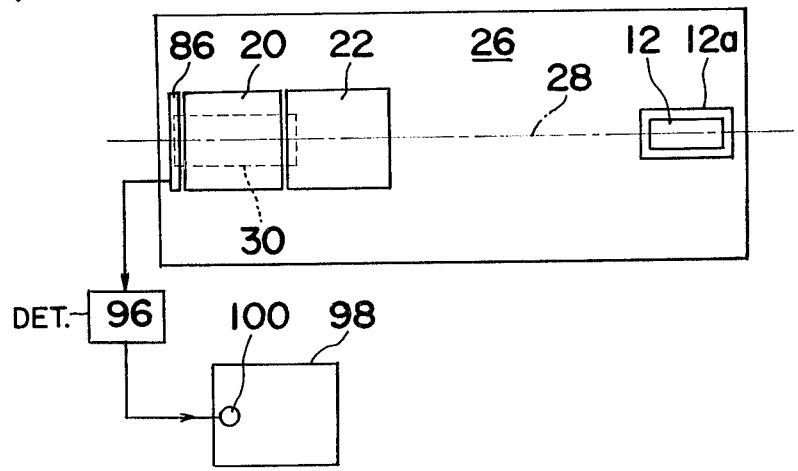
Fig. 7

DISTANCE MEASURING DEVICE FOR USE IN A CAMERA

BACKGROUND OF THE INVENTION

1. Field of the Invention

The present invention relates to a distance measuring device for use in a camera and, more particularly, to a device which can automatically determine the distance from the camera to a subject to be photographed by the application of triangulation technique, and can automatically focus the camera lens in accordance with the determination.

2. Description of the Prior Art

Many cameras employing a distance measuring device have been proposed, and one of which is disclosed in Tokkosho (Japanese Patent Publication) 54-39731 published Nov. 29, 1979. The basic principle of the distance measuring device disclosed in this prior art involves directing onto the subject a beam of light emitted from a light source positioned in predetermined positional relationship with respect to the camera; receiving, at a location kept apart from the light source by a predetermined base length, a beam reflected back to the camera from the subject; and detecting the position on the receiving device of the beam reflected from the subject, in order to determine the distance to the subject.

A light receiving device which is disclosed in Tokkosho 54-39731 is shown in FIG. 1, and includes a pair of rectangular photosensitive elements 2 and 4 positioned on opposite sides of a predetermined base line 6 of the triangulation theory with their longer side edges being parallel to the base line 6, and a mask 8 having an opening 8a formed therein. The mask 8 is positioned in front of the photosensitive elements 2 and 4 so that the area available for receiving the reflected light beam by the photosensitive elements 2 and 4 is restricted to the area defined by the opening 8a. As shown in FIG. 1, the lower side edge of the opening 8a extends in a direction which is parallel to the base line 6 but the upper side edge is slanted such that the distance between the upper edge of the opening 8a and the base line 6 becomes greater towards right-hand direction. The light receiving device shown is provided in association with an optical arrangement (not shown) including a cylindrical lens for forming an elongated line image 10 which is perpendicular to the base line 6, said image 10 being formed on the photosensitive elements 2 and 4, and said image 10 being caused by the light reflected from the subject. The line image 10 is formed so long that it may extend across the opening 8a. Thus, no matter where the image is located, it may extend a section of the opening 8a from upper edge to the lower edge. The position of the line image 10 along the base line 6 has relationship with respect to the distance to the subject from which the reflected beam is directed. More particularly, when the distance to the subject is comparatively short, the line image 10 will be located at the left-hand end of the opening 8a, and as the distance to the subject increases, the line images 10 shifts rightwardly towards the opposite end of the opening 8a. When the distance to the subject is very far, the line image 10 will be located at the right-hand end of the opening 8a. When the photosensitive elements 2 and 4 receive the line image 10, the output signal of the photosensitive element 2 relates to both the position along the base line 6 and the light intensity of the line image 10, while the output signal of the photosensitive element 4 relates to only the light intensity of the line image 10. Thus, the difference in output signals between the photosensitive elements 2 and 4 relates to only the position of the line image 10 along the base line 6, and this difference provides the information of the distance to the subject.

When it is desired to incorporate the above described device in a compact size camera while maintaining a predetermined distance measuring accuracy, the area of the photosensitive elements 2 and 4, particularly the area available for receiving light therein, will be reduced, and the width of the line image 10 must be made very thin. Although this can be accomplished, e.g., by the employment of a slit in front of the light source for emitting a narrow strip-like beam or by the use of optical arrangement in the receiving device capable of forming a very thin line image 10 on the photosensitive elements 2 and 4, such a slit or arrangement absolutely reduces the light amount received by the photosensitive elements 2 and 4, and as an inevitable consequence thereof the, signal produced from the elements 2 and 4 becomes very weak, making it difficult to detect the distance to the subject, particularly when the subject is located far from the camera.

This defect can be solved, e.g. by the employment of a powerful light source actuated by a powerful battery, but the result is such that the camera will become considerably large in size and heavy in weight. Therefore, from this point of view, it is difficult for the distance measuring device of the above described prior art to be made compact in said while maintaining a predetermined distance measuring accuracy. Furthermore, since the mask 8 intercepts the end portions of the line image 10 by the upper and lower edges of the opening 8a, the reflected light beam received by the elements 2 and 4 is less than the light which has passed through the cylindrical lens positioned in front of the elements 2 and 4. This also weakens the signal produced from the elements 2 and 4.

Furthermore, when the subject has a different reflectance between portions, e.g., between upper and lower portions, the intensity of the light beam received by the element 2 and that by the element 4 will be affected by the different reflectance, and therefore, the signals obtained from the elements 2 and 4 will not represent the correct distance to the subject.

SUMMARY OF THE INVENTION

Accordingly, it is a primary object of the present invention to provide a distance measuring device which eliminates above described defects.

It is another object of the present invention to provide a distance measuring device of the above described type which can efficiently utilize the light reflected from the subject.

It is a further object of the present invention to provide a distance measuring device of the above described type which is compact in size and can readily be manufactured at a low cost.

It is yet another object of the present invention to provide a distance measuring device of the above described type which is simple in construction but has a high reliability.

It is a still further object of the present invention to provide a distance measuring device of the above described type which can automatically focus a camera's picture-taking lens to a proper focusing position.

In accomplishing these and other objects, a distance measuring device according to the present invention comprises a means for emitting light toward a subject to be photographed and a means for receiving the light reflected from the subject and for forming an image. The receiving means is spaced a predetermined base length from the emitting means and comprises first and second light receiving elements which are positioned closely adjacent to each other. The first receiving element is located further away from the emitting means than the second receiving means such that a boundary between the first and second receiving elements extends substantially perpendicularly with respect to the base line. The first and second receiving elements are adapted to respectively produce first and second electric signals which have a relationship with respect to an area occupied by the image on the first and second receiving elements.

The distance measuring device according to the present invention further comprises an electric circuit means connected to the receiving means for producing a distance signal based on the first and second electric signals.

According to the preferred embodiment, the distance measuring device further comprises a moving means for moving a camera's picture-taking lens between its nearest focusing position and its infinite focusing position, a detecting means for detecting a position of the lens and for producing a position signal, a comparing means for comparing the position signal with the distance signal and for producing a stop signal when the position signal reaches a predetermined relationship with respect to the distance signal, and stopping means for stopping the movement of the lens upon receipt of the stop signal.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which:

FIGS. 6A-6D are waveforms obtained at major points in the circuit of FIG. 5; and FIG. 7 is a view similar to FIG. 3 but particularly showing a variation thereof.

DESCRIPTION OF THE PREFERRED EMBODIMENT

Figure 2:
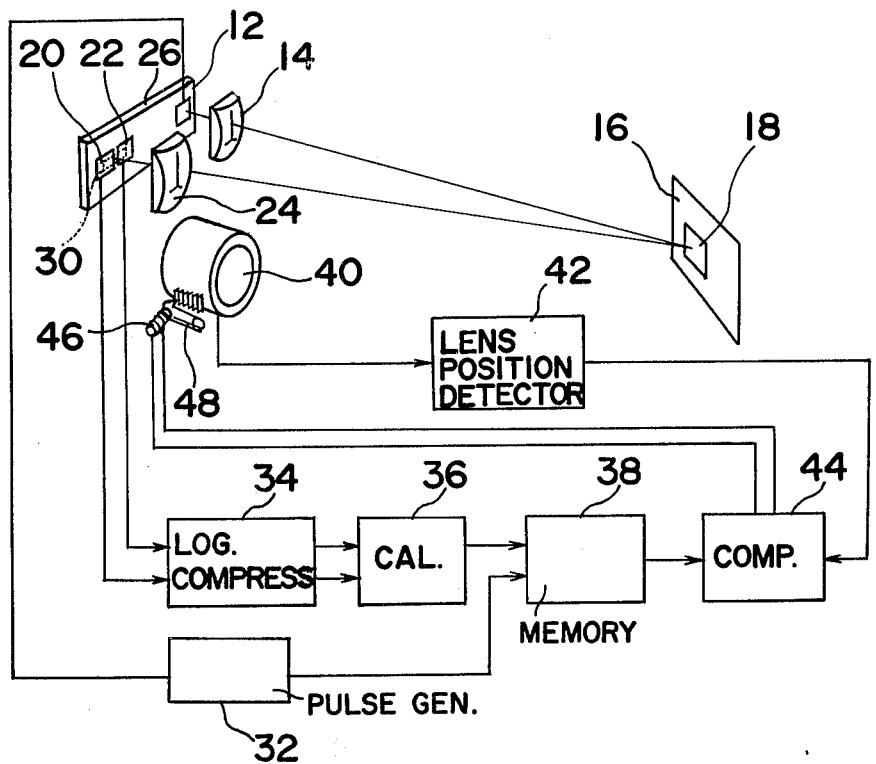
FIG. 2 is a diagrammatic view of a distance measuring device according to an embodiment of the present invention.

Referring to FIG. 2, there is shown a preferred embodiment of the distance measuring device according to the present invention. A reference numeral 12 designates a light source, such as a light emitting diode, and 14 designates a convergent lens assembly for a directing light beam emitted from the light emitting diode 12 towards a subject 16. The light emitting diode 12 and the convergent lens assembly 14 define a light emitting means for emitting a light beam and for forming a plain rectangular image 18 on the subject 16. Reference numerals 20 and 22 designate a pair of light receiving elements for receiving the light beam which has been emitted from the light emitting diode and reflected from the subject 16. A reference numeral 24 designates a convergent lens assembly for forming an image 30 from the reflected light beam upon the light receiving elements 20 and 22. The light receiving elements 20 and 22 and the convergent lens assembly 24 define a light receiving means for receiving a light beam including the planar rectangular image 30, which is identical to the image 18. The light emitting diode 12 and the light receiving elements 20 and 22 are fixedly mounted on a common base plate 26 at a predetermined distance spaced from each other.

Figure 1:
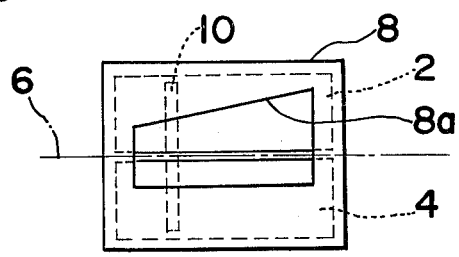
FIG. 1 is a plane view of a light receiving device of a prior art.
Figure 3:
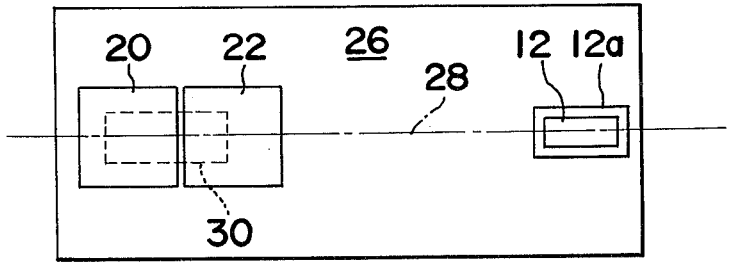
FIG. 3 is a plane view of a base plate mounted with light emitting element and light receiving elements, according to the embodiment of FIG. 2.

Referring particularly to FIG. 3, the base plate 26 has a rectangular configuration, and the light emitting diode 12 is fixedly mounted on one end portion of the base plate 26. A reference numeral 12a designates an electrode portion of the light emitting diode 12. Laterally spaced apart from the light emitting diode 12 along a base line 28 which is the same as the base line 6 of FIG. 1 and positioned at the other end portion of the base plate 26 are the light receiving elements 20 and 22, each having a rectangular configuration. The light receiving elements 20 and 22 are positioned closely adjacent to each other and their boundary extends perpendicularly to the base line 28. The planar rectangular image 30 formed by the convergent lens assembly 24 as it receives the reflected light beam from the subject 16 extends laterally (in the direction of the base line 28) over the light receiving elements 20 and 22. As understood from the trigonometric theory, the image 30 moves, when viewed in FIG. 3, towards right as the distance to the subject 16 becomes greater, and towards left as the distance becomes shorter. Therefore, the ratio of image 30 covering on the light receiving elements 20 and 22 varies as the distance to the subject 16 changes. Accordingly, the signal level produced from the light receiving elements 20 and 22 varies correlatively with respect to the distance to the subject 16. More particularly, when the distance to the subject 16 is short, the light receiving element 20 produces a very high level signal and the light receiving element 22 produces a very low level signal. On the other hand, when the distance to the subject 16 is long, the light receiving element 20 produces a very low level signal and the light receiving element 22 produces a very high level signal. It is to be noted that the light receiving means is so designed as to permit the detection of a distance to the subject 16 which is located farther than the nearest available distance that the taking lens can properly focusing.

According to the present invention, since there is no mask provided in front of the light receiving elements 20 and 22, and since the image 30 formed by the convergent lens assembly 24 is not a line image but a planar image, the light beam emitted from the light emitting diode 12 and reflected from the subject 16 can be received by the light receiving elements 20 and 22 effectively. Accordingly, a subject 16 which is located a long distance away from the camera can be detected without using a powerful light emitting diode 12, and thus, a battery for actuating the light emitting diode 12 can be a small compact battery. Therefore, the distance measuring device, according to the present invention, can be arranged so as to be of a compact size while maintaining a predetermined distance measuring accuracy.

Furthermore, as to a subject 16 partly having a different reflectance, since the light beam reflected from the subject is equilibrated on the planar image 30, there will be less influence on the accuracy of distance measurement caused by such a difference in the reflectance.

Referring back to FIG. 2, a reference numeral 32 designates a pulse generator for producing a single pulse in response to an actuation effected, for example, by the depression of a shutter button. The single pulse produced from the pulse generator 32 is supplied to the light emitted diode 12 for effecting the emission of one shot of light therefrom, and is also supplied to a memory circuit 38 for effecting the reset of the memory circuit 38. A reference numeral 34 designates a logarithmic compression circuit for amplifying and logarithmically compressing only the pulsating current signals respectively obtained from the light receiving elements 20 and 22 and for producing logarithmically compressed voltage signals. These voltage signals are supplied to a calculation circuit 36 which calculates a difference between the voltage signals and supplies the calculated difference to the memory circuit 38. The memory circuit 38 then stores the calculated difference.

Since the calculation circuit 36 calculates the difference between logarithmic values of the signals from the light receiving elements 20 and 22, it is understood that the difference signal produced from the calculation circuit 36 has a relationship with respect to the ratio between the signals produced from the light receiving elements 20 and 22. Therefore, such a difference signal from the calculation circuit 36 provides information with respect to the distance to the subject 16.

Figure 4:
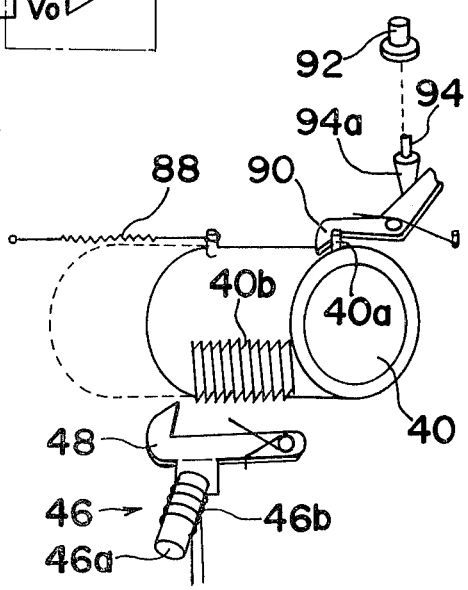
FIG. 4 is a diagrammatic view showing a camera's picture-taking lens and its associated parts.

A reference numeral 40 designates a camera's picture-taking lens and its lens barrel which is shown in detail in FIG. 4. Referring to FIG. 4, the camera's picture-taking lens 40 is provided movably between the nearest distance position and an infinite distance position (shown by a dotted line) and is biased towards the infinite distance position by a spring 88. The lens 40 has a projection 40a which can be engaged by a hook provided at the end of a lever 90. The lever 90 is biased to rotate counterclockwise to ensure the engagement between the projection 40a and the hook so that the lens 40 is held in the near focusing setting. The other end of the lever 90 is provided operatively in association with a tapered rod 94 which is linked with a shutter button 92. When the shutter button 92 is depressed, the tapered end portion 94a of the rod 94 pushes said other end of the lever 90 to rotate the lever 94 clockwise. Accordingly, the hook disengages the projection 40a permitting shifting of the lens 40 towards infinite distance position. The lens 40 is further provided with notches 40b which can be engaged with a pawl 48. The pawl 48 is biased towards the notches 40b but is normally held away from the notches by a permanent magnet 46a holding a portion of the pawl 48 by its attraction. When a coil 46b wound on the permanent magnet 46a is energized, in a manner which will be described later, the magnetic attraction of the permanent magnet 46a is counterbalanced with the magnetic force excited by the coil 46b, thereby releasing the pawl 48 for the engagement with one of notches 40b. The lens 40 is further coupled with a lens position detector 42 (FIG. 2) which produces a signal representing the position of the camera's picture-taking lens 40.

Referring to FIG. 2, a comparator 44 receives a signal representing the distance to the subject 16 from the memory circuit 38 and a signal representing the lens position from a lens position detector 42. When the signal representing the lens position matches the signal representing the distance to the subject 16, the comparator 44 produces a signal that excites the coil 46b wound on the permanent magnet 46, thereby engaging the pawl 48 with one notch and stopping the lens 40. It is to be noted that the lens 40 thus stopped is in a position for properly focusing the subject 16.

Figure 5:
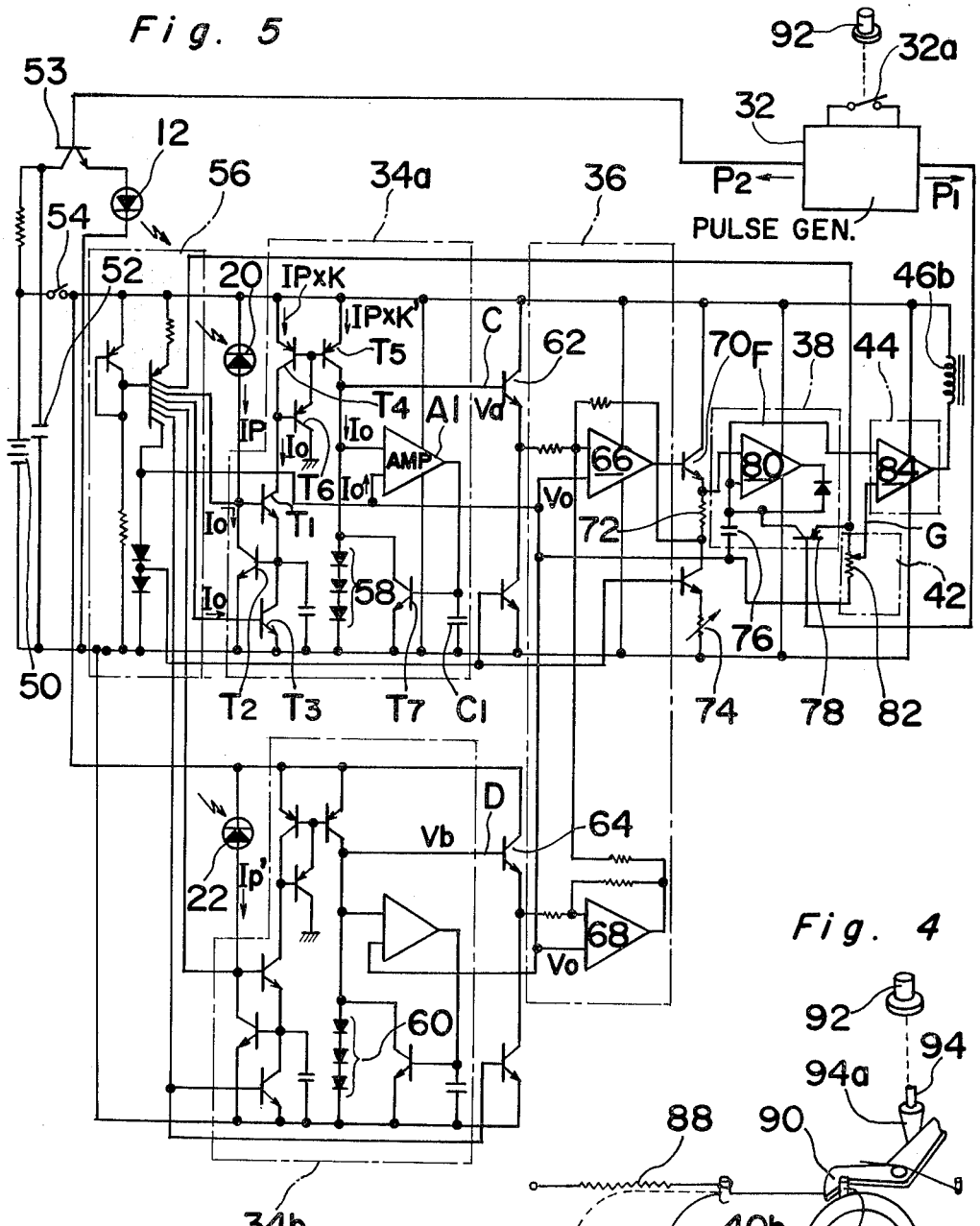
FIG. 5 is a circuit diagram of a distance measuring device according to an embodiment of the present invention.

Referring to FIG. 5, one embodied circuit diagram based on the block diagram of FIG. 2 is shown. In FIG. 5, a reference numeral 50 designates a source of power such as a battery; reference numeral 52 designates a capacitor which charged to a voltage necessary to actuate the light emitting diode 12 to emit one shot of light; reference numeral 53 designates a switching transistor connected to the pulse generator 32 for supplying, when it is turned on, the voltage on the capacitor 52 to the light emitting diode 12, and reference numeral 54 designates a main switch. A block designated by a reference numeral 56 is a power circuit which is defined by transistors, diodes and resistors and which supplies a constant voltage Vo and constant current Io to the following circuit when the main switch 54 closes. A logarithmic compression circuit 34a is connected to the light receiving element 20 for amplifying and logarithmically compressing the pulsating signal produced from the light receiving element 20 in a manner which will become apparent from the following description.

The logarithmic compression circuit 34a is defined by transistors T1, T2, T3, T4, T5, T6 and T7, logarithmic compression diodes 58, capacitor C1 and amplifier A1. It is to be noted that the transistors T4, T5 and T6 form a so-called mirror circuit. When the light receiving diode 20 receives no pulsating reflected light from the subject 16, the constant current Io flows through the following lines: a line extending from the power circuit 56 and connected to the collector of the transistor T2; a line extending from the power circuit 56 and connected to the base of the transistor T3; the lines connected to the emitter and collector of transistors T4, T1 and T3; the lines connected to the emitter and collector of transistor T5; and a line connected to one input of the amplifier A1. Furthermore, the constant voltage Vo is present at the following points: the base of the transistor T1; and said one input of the amplifier A1. Then when the light receiving diode 20 receives a pulse of reflected light from the subject 16, the light receiving diode 20 produces a pulse of current Ip, as shown by the waveform in FIG. 6A. Accordingly, the current flowing through the transistor T4 changes from Io to Ip×k (k is a constant) and the current flowing through the transistor T5 changes from Io to Ip×k' (k' is a constant). The increase of current flowing through the transistor T5 from Io to Ip×k' results in an increase in the voltage at the other input of the amplifier A1, thereby producing a high level signal from the amplifier A1. This high level signal from the amplifier A1 is supplied to the capacitor C1. However, since the capacitor C1 is charged with a time constant determined by its inherent characteristics, the voltage level at the base of the transistor T7 hardly increases. Thus, the current Ip×k' from the transistor T5 flows through the diodes 58, thereby producing a logarithmically compressed voltage signal Va along a line C, as shown by the waveform in FIG. 6B.

As is apparent from the foregoing description, the voltage signal produced along the line C has a relationship with respect to the logarithmically compressed value of the current Ip produced from the light receiving element 20. In the case where the current Ip from the light receiving element 20 increases slowly due to the change in the ambient light, the current flowing through the transistor T5 changes slowly. In this case, the capacitor C1 is charged to the predetermined level before the voltage level at the line C increases to a voltage corresponding to the reflected pulsating light. Thus, the current flow through the transistor T5 is directed to diodes 58, producing no voltage signal along the line C.

The logarithmically compressed voltage signal Va produced along the line C is supplied to a transistor 62 used for effecting an impedance change and is further supplied to one input of a comparator 66.

A logarithmic compression circuit 34b has the same structure as the logarithmic compression circuit 34a and is connected to the light receiving element 22 for amplifying and logarithmically compressing the pulse signal Ip' produced from the light receiving element 22. The waveform of such a pulse signal Ip' is shown in FIG. 6A. Accordingly, when the light receiving element 22 receives a pulse of reflected light from the subject 16, a pulse of current produced from the light receiving element 22 is amplified and logarithmically compressed in a series of diodes 60. Thus, a logarithmically compressed voltage signal Vb, as shown in graph B of FIG. 6, is produced along a line D.

The logarithmically compressed voltage signal Vb produced along the line D is supplied to a transistor 64 used for effecting an impedance change and is further supplied to one input of a comparator 68.

The calculation circuit 36 includes the above mentioned comparators 66 and 68 and resistors. One input of each of the comparators 66 and 68 receives a logarithmically compressed voltage signal and the other input thereof receives a constant voltage Vo from the power circuit 56. Each of the comparators 66 and 68 operates in such a manner that the signals supplied to its inputs are added together and the sum is multiplied by $-1$. Accordingly, the comparator 68 produces a signal $-(Vb+Vo)$. Similarly, the comparator 66 produces a signal $-(Va-(Vb+Vo)+Vo)$ which is substantially equal to a signal $-(Va-Vb)$. A waveform of the voltage signal Vb−Va is shown in FIG. 6C. Therefore, a signal produced from the calculation circuit 36, i.e., from the comparator 66, is equal to the difference between the logarithmically compressed signals Va and Vb. As mentioned above, such a difference has a relationship with respect to the ratio between the light received by the light receiving element 20 and the light received by the light receiving element 22.

The difference signal Vb−Va produced by the calculation circuit 36 is supplied to the memory circuit 38 through a transistor 70. Resistors 72 and 74 are provided for adjusting the voltage level of the difference signal Vb−Va to a level corresponding to the voltage representing the lens position signal obtained from a potentiometer 82. Of the resistors 72 and 74, the adjustment is carried out by the variable resistor 74.

The memory circuit 38 includes a memory capacitor 76, a switching transistor 78, a comparator 80 and a diode. When the switching transistor 78 is turned on, the capacitor 76 is charged by the power circuit 56. This voltage is equal to the maximum available voltage that the tap of the potentiometer 82 can produce. Then, when the switching transistor 78 is turned to its off state by a pulse produced from the pulse generator 32 and when the difference signal Vb−Va from the transistor 70 is supplied to the comparator 80, the comparator 80 produces a low level signal relative to the difference signal Vb−Va and the capacitor 76 is discharged by such a low level signal to a level determined by the difference signal Vb−Va, as shown by the waveform F in FIG. 6D. The voltage obtained from the capacitor 76 is supplied to one input of a comparator 84, which defines the comparator 44 described above in connection with FIG. 2.

The potentiometer 82, which defines the lens position detector 42 described above in connection with FIG. 2, is provided operatively in association with the picture-taking lens 40 such that its tap shifts over the resistor element from one end, as shown in FIG. 5, to the other end, as the picture-taking lens 40 moves from the nearest distance position to the infinite distance position. Accordingly, as the tap shifts along the resistor element of the potentiometer 82, the other input of the comparator 84 receives a voltage signal which gradually decreases, as shown by the waveform G in FIG. 6D.

When the voltage level from the tap of the potentiometer 82 coincides with the voltage level from the capacitor 76, the comparator 84 produces a signal that excites the coil 46b wound on the permanent magnet 46a. Accordingly, the pawl 48 engages in one of the notches 40b formed in the lens 40, thus stopping the movement of the lens 40. The stopping of the lens 40 also stops the tap of the potentiometer 82, and accordingly, the gradual decrease of the voltage signal from the potentiometer 82 stops, as shown by the waveform G in FIG. 6D.

The operation of the circuit of FIG. 5 is essentially as follows. First, the main switch 54 is turned on by an operating member (not shown) for supplying power to the circuit. Then, upon depressing the shutter button 92 to its half-way, a switch 32a coupled to the pulse generator 32 closes to produce a positive going pulse P1 to the switching transistor 78 and another positive going pulse P2 to the switching transistor 53. It is to be noted that the pulse P2 is produced immediately after the leading edge of the pulse P1. Furthermore, the pulse duration of the pulse P1 is much longer than that of the pulse P2.

Upon receipt of the pulse P1, the switching transistor 78 turns off, thereby stopping the power supplied to the capacitor 76. In this condition, the capacitor 76 has charged up to the voltage corresponding to the maximum output voltage of the potentiometer 82.

On the other hand, the switching transistor 53 conducts upon receipt of the pulse P2 from the pulse generator 32, and accordingly, at a time Ta shown in FIGS. 6A-6D, the light emitting diode 12 emits a pulse of light by the discharge of power accumulated in the capacitor 52. The emitted light reflects off of the subject 16, and the reflected light is detected by the light receiving elements 20 and 22. As mentioned above, the ratio of the amount of received light between the light receiving elements 20 and 22 has a relationship with respect to the distance to the subject 16. It is to be noted that each of the light receiving elements receives not only the reflected light from the subject 16 but also ambient light. Accordingly, it is understood that the pulse signals Ip and Ip' (graph A of FIG. 6) produced from the light receiving elements 20 and 22 are carried on a certain level signal.

Then, in the logarithmic compression circuits 34a and 34b, only the pulse portion of the pulse signals Ip and Ip' is amplified and logarithmically compressed in the above described manner. Thus, the logarithmic compression circuits 34a and 34b respectively produce voltage signals Va and Vb shown in FIG. 6B. The signals Va and Vb respectively pass through impedance matching transistors 62 and 64 and are supplied to the calculation circuit 36 for producing the difference signal Vb-Va shown in FIG. 6C. As is apparent from FIG. 6C, the difference signal Vb-Va changes relatively with respect to time, and reaches its negative peak point at a time Tb shown in FIG. 6C, i.e., at the time when the signals Ip and Ip' reach their peak point.

The difference signal Vb-Va is supplied through the transistor 70 to a memory circuit 38 in which the comparator 80 thereupon produces a signal similar to the difference signal Vb-Va. Accordingly, the capacitor 76, which has been charged as described above, discharges due to a current directed from the capacitor 76 to the input of the comparator 80 through a diode. Thus, the voltage finally charged on the capacitor 76 corresponds to the minimum voltage level produced from the comparator 80. It is to be noted that such a voltage level has a relationship with respect to the distance to the subject 16.

Then, when the shutter button 92 is depressed all the way, at a time Tc shown in FIGS. 6A-6D, the tapered rod 94 turns the level 90 to disengage from the hook 40a of the lens 40, and accordingly, the lens 40 shifts from the nearest distance position to infinite distance position. During the lens shift, the voltage obtained from the tap of the potentiometer 82 gradually decreases, and when this voltage reaches the same level as the voltage from the capacitor 76, at a time Td shown in FIGS. 6A-6D, the comparator 84 produces a signal that excites the coil 46b. Accordingly, the pawl 48 engages in one of the notches 40b, thereby stopping the lens 40 at a proper focusing position for subject 16.

Immediately thereafter, an aperture (not shown) of the camera opens according to the set exposure value by known means to take the picture of the subject 16.

Referring to FIG. 7, there is shown a variation of the light receiving portion. In addition to the light receiving elements 20 and 22, the light receiving means shown further includes another light receiving element 86 on a side of the light receiving element 20 opposite to the side bounded by the light receiving element 22. It is to be noted that the boundary between the light receiving elements 20 and 86 extends perpendicularly with respect to the base line 28.

As understood to those skilled in the art, the image 30 of the reflected light from the subject 16 moves leftwardly, when viewed in FIG. 7, when the distance to the subject 16 becomes shorter. The light receiving elements 20, 22 and 86 are disposed in such a manner that when the subject 16 is located at the nearest position available for focusing the taking lens 40, the left-hand side edge of the image 30 comes into alignment with the boundary between the light receiving elements 20 and 86. If the subject 16 is located closer to the camera than the above, the image 30 of the reflected light will be partly formed on the light receiving element 86. In this case, the light receiving element 86 produces a signal which is detected by a circuit 96, and thereupon, the circuit 96 produces a signal that actuates a light emitting diode 100 which is provided visually in a view finder 98 so as to warn the photographer that the subject 16 is located closer than the nearest available distance that the picture-taking lens can properly focus.

It is only necessary for the light receiving element 86 to detect when the image 30 is formed thereon. Accordingly, the size of the light receiving element 86 can be relatively small.

The rectangular image 30 formed on the light receiving elements 20 and 22 is shown as having a height, measured perpendicularly with respect to the base line 28, and smaller than the height of the light receiving elements 20 and 22, whereby if a deviation of the rectangular image 30 has occurred in the direction which is perpendicular to the base line 28, as long as at least a portion of the image 30 is formed on the light receiving elements 20 and 22, the distance to the subject can be determined. The width of the image 30, measured parallel to the base line 28, can be wider than the width of the light receiving elements.

It is to be noted that the term "light" used herein is understood as including not only light in the visual region but also light in the infrared and ultraviolet regions.

It is also to be noted that the term "camera" used herein includes not only still film photographic cameras but also television cameras, video cameras and movie cameras.

The present invention described above has the advantages given below.

Since there is no mask provided in front of the light receiving elements 20 and 22, and/or in front of the light emitting diode 12, the light receiving means and light emitting means can be formed with a compact size and with a simple structure. Furthermore, the light beams which impinge on the light receiving means can be detected effectively by the light receiving elements 20 and 22. Therefore, the distance measuring device according to the present invention can be made compact in size with a predetermined distance measuring accuracy without employing a powerful power source.

Since the image formed on a subject by the emitted light and the image formed on the light receiving means are not line images, but planar images, the difference of the reflected light intensity due to the different reflectance between portions of the subject, is averaged. Therefore, the difference of the reflectivity within the subject will not affect the distance measuring. This advantage also leads to high accuracy of the distance measuring, and compact size of the device.

Since the distance measuring device according to the present invention has a logarithmic compression circuit 34 which amplifies and logarithmically compresses only the pulse portion of the signal obtained from the light receiving elements 20 and 22, the background signal produced by the ambient light can be eliminated. This improves the accuracy of the distance measuring.

Since the light emitting element and light receiving elements are provided on the same base plate 26, the light emitting diode 12 and light receiving elements 20 and 22 can be assembled simply and precisely.

Since the distance measuring device according to the present invention has no mechanically operating portion but only an electrically operating portion for obtaining the signal representing the distance to the subject, very little noise will be included in the obtained distance signal (signal Vb-Va).

Since the distance to the subject according to the present invention is determined by the ratio of area of the image 30 occupied on the light receiving element 20 to that on the light receiving element 22, a deviation of the image 30 in a direction which is perpendicular with respect to the base line 28 will not result in an erroneous detection, as long as at least a portion of the image 30 is formed on the light receiving elements 20 and 22.

Although the present invention has been fully described with reference to the preferred embodiment, many modifications and variations thereof will now be apparent to those skilled in the art, and the scope of the present invention is therefore to be limited not by the details of the preferred embodiment described above, but only by the terms of appended claims.

What is claimed is:

1. A distance measuring device for use in a camera having an objective lens comprising:
    a means for emitting light toward an object to be photographed for forming a light spot of a predetermined shape on said object;
    a means, spaced from said emitting means by a predetermined base length, for receiving the light reflected from said object positioned within a normal distance range determined in accordance with said objective lens, said receiving means consisting of only two receiving elements which respectively constitute first and second receiving elements being positioned closely adjacent to each other;
    wherein said first receiving element is located further away from said emitting means than said second receiving element such that a boundary between said first and second receiving elements extends in a direction which is substantially perpendicular to the direction of said base length, said first and second receiving elements having means for respectively producing first and second electric signals having values respectively corresponding to amounts of said reflected light received by said first and second receiving elements;
    said measuring device further comprising a means for forming an image of said light spot on said first and second receiving elements such that both ends of said image along said direction of said base length are respectively positioned on said first and second receiving elements when said object is positioned within said normal distance range, said image bridging both of said receiving elements; and
    a means for producing a distance signal which is representative of the distance from said camera to said object based on the ratio of the values of said first and second electric signals.

2. A distance measuring device as claimed in claim 1, wherein said emitting means comprises a light emitting diode which is adapted to produce a single pulse of light.

3. A distance measuring device as claimed in claim 1, wherein said image has a height, measured in a direction which is perpendicular to said direction of said base length, which is smaller than the height of each of said first and second receiving elements.

4. A distance measuring device as claimed in claim 1, wherein said means for producing a distance signal comprises a logarithmic compression circuit for logarithmically compressing said first and second electric signals, and a calculation circuit for calculating a difference between a logarithmically compressed first signal and a logarithmically compressed second signal, and for producing a difference signal representing said difference, said difference signal bearing a correspondence to said distance signal.

5. A distance measuring device as claimed in claim 1, further comprising a base plate on which said emitting means and receiving means are fixedly mounted.

6. A distance measuring device as claimed in claim 1, wherein said image forming means comprises a lens assembly which forms said image on said first and second receiving elements so as to bridge both of said receiving elements.

7. A distance measuring device for use in a camera having a picture-taking lens adapted to move between a nearest distance position and infinite distance position, said distance measuring device provided in association with said picture-taking lens for setting said lens in a proper focusing position for an object, said distance measuring device comprising:
    a means for emitting light toward an object to be photographed for forming a light spot of a predetermined shape on the subject;
    a means, spaced from said emitting means by a predetermined base length, for receiving the light reflected from said object positioned within a normal distance range determined in accordance with said picture-taking lens, said receiving means consisting of only two receiving elements which respectively constitute first and second receiving elements and which are positioned closely adjacent to each other, said first receiving element being located further away from said emitting means than said second receiving element such that a boundary between said first and second receiving element extends in a direction which is substantially perpendicular to the direction of said base length, said first and second receiving elements having means for respectively producing first and second electric signals having values respectively corresponding to amounts of said reflected light received by said first and second receiving elements;
    a means for forming an image of said light spot on said first and second receiving elements such that both ends of said image along said direction of said base length are respectively positioned on said first and second receiving elements when said object is positioned within said normal distance range, said image bridging both of said receiving elements;
    a means for producing a distance signal which is representative of the distance from said camera to said object based on the ratio of the values of said first and second electric signals;
    a means for moving said picture-taking lens between said nearest distance position and infinite distance position;
    a means for detecting a position of said picture-taking lens and for producing a position signal;
    a means for comparing said position signal with said distance signal and for producing a stop signal when said position signal reaches a predetermined relationship with respect to said distance signal; and
    a means for stopping the movement of said picture-taking lens upon receipt of said stop signal.

8. A distance measuring device as claimed in claim 1 or 7, further comprising a memory means for storing said distance signal.

* * * * *